(12) United States Patent
Natanzon et al.

(10) Patent No.: US 10,120,925 B1
(45) Date of Patent: Nov. 6, 2018

(54) DATA SYNCHRONIZATION

(71) Applicant: EMC Corporation, Hopkinton, MA (US)

(72) Inventors: Assaf Natanzon, Tel Aviv (IL); Yair Cohen, Pardes Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 350 days.

(21) Appl. No.: 14/870,147

(22) Filed: Sep. 30, 2015

(51) Int. Cl.
*G06F 17/30* (2006.01)
*G06F 9/455* (2018.01)
*H04L 29/08* (2006.01)

(52) U.S. Cl.
CPC .... *G06F 17/30575* (2013.01); *G06F 9/45558* (2013.01); *H04L 67/1095* (2013.01); *G06F 2009/45583* (2013.01)

(58) Field of Classification Search
CPC ....... G06F 17/30575; G06F 2009/4557; G06F 9/45558; G06F 2009/45583; H04L 67/1095
See application file for complete search history.

(56) References Cited

U.S. PATENT DOCUMENTS

| 2006/0155735 | A1* | 7/2006 | Traut | G06F 9/445 |
| 2015/0106802 | A1* | 4/2015 | Ivanov | G06F 9/45558 718/1 |
| 2015/0227543 | A1* | 8/2015 | Venkatesh | G06F 9/45533 707/620 |

* cited by examiner

*Primary Examiner* — Robert W Beausoliel, Jr.
(74) *Attorney, Agent, or Firm* — Krishnendu Gupta; Robert Kevin Perkins

(57) ABSTRACT

A computer implemented method for reading signatures corresponding to a portion of data on a virtual machine disk on a production site, wherein reading the signature includes mapping the virtual machine disk offset into a physical storage offset, and reading the signature from the physical storage; sending the signature of the portion of data to a replication site; obtaining a mapping from a virtual disk to a physical disk at the replica site; issuing a command to write a portion of data corresponding to the signature to a the physical storage based on the mapping of the replica of the virtual machine disk on the replication site; determining if the command was successful; and based on a determination that the command was not successful, marking the locations corresponding to the signature for synchronization in a synchronization structure.

19 Claims, 11 Drawing Sheets

DATA SYNCHRONIZATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure generally relates to data replication and/or data synchronization.

BACKGROUND

Generally speaking data may be vital to today's organizations, and a significant part of protection against disasters may be focused on data replication/backups. As solid-state memory may have advanced to the point where cost of memory has become a relatively insignificant factor, organizations may afford to operate with systems that store and process terabytes of data.

Conventional data protection systems include backup drives for storing organizational production site data on a periodic basis. Such systems suffer from several drawbacks. First, they may require a system shutdown during backup since the data being backed up cannot be used during the backup operation. Second, they limit the points in time to which the production site can recover. For example, if data is backed up on a daily basis, there may be several hours of lost data in the event of a disaster. Third, the data recovery process itself may take a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

Embodiments of the present disclosure include an apparatus, an article of manufacture, a computer program product and a computer implemented method for reading signatures corresponding to a portion of data on a virtual machine disk on a production site. A further embodiment may include reading signatures that may further include mapping the virtual machine disk offset into a physical storage offset. A further embodiment may include reading signatures from the physical storage. A further embodiment may include sending signatures of a portion of data to a replication site. A further embodiment may include obtaining a mapping from a virtual disk to a physical disk at the replica site. A further embodiment may include issuing a command to write a portion of data corresponding to signature to a physical storage based on a mapping of a replica of a virtual machine disk on a replication site. A further embodiment may include determining if a command for "write by hash" was successful; and based on a determination that the command was not successful, marking locations corresponding to signature for synchronization in a synchronization structure.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Figure 1:
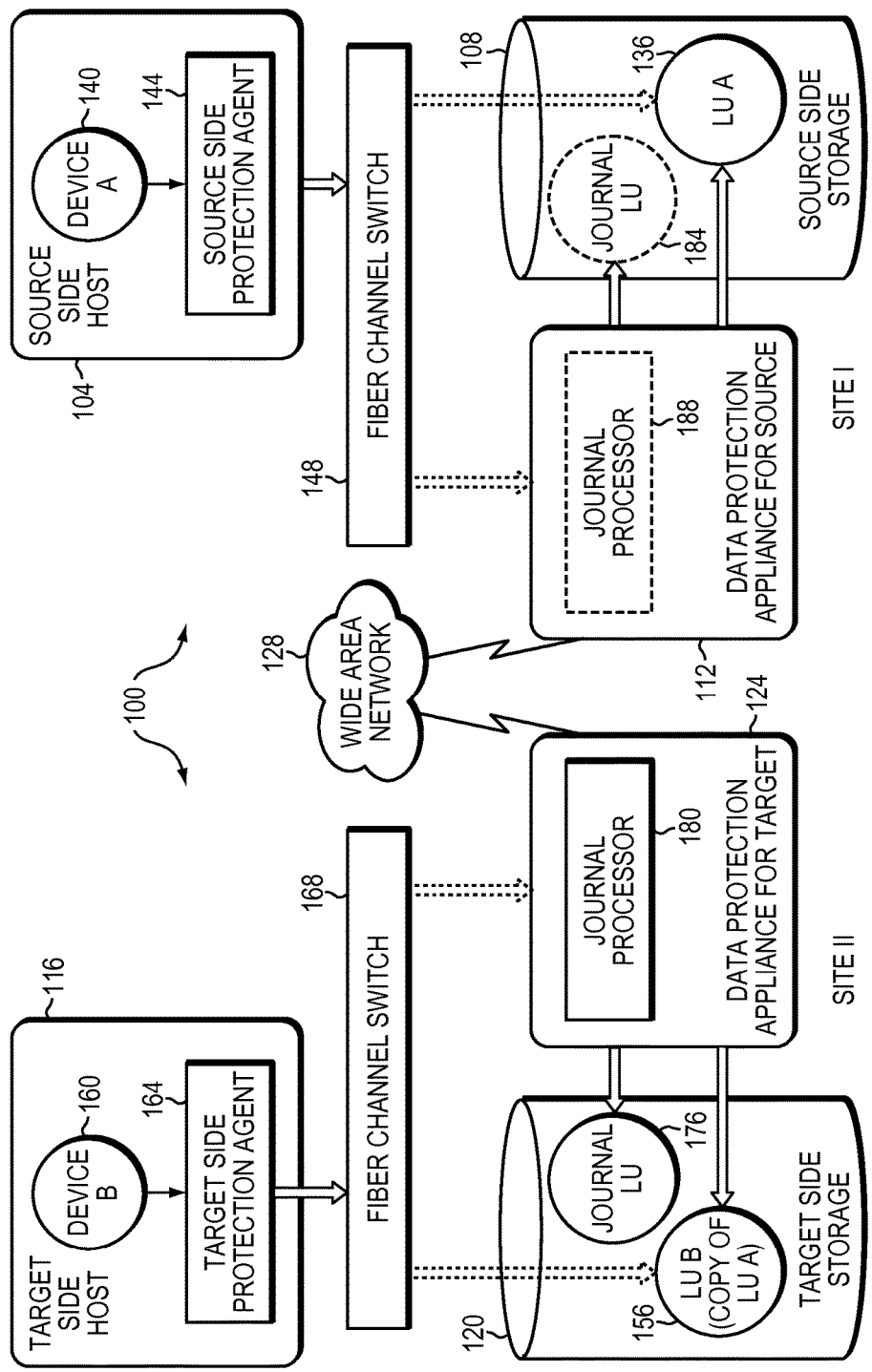
FIG. 1 is an exemplary block diagram of a data protection system according to an embodiment of the present disclosure.

It may be noted that the flowcharts and block diagrams in the figures may illustrate the apparatus, method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

DETAILED DESCRIPTION

The following definitions are employed throughout the specification and claims.

BACKUP SITE—may be a facility where replicated production site data is stored; the backup site may be located in a remote site or at the same location as the production site;

CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system;

RPA—may be replication protection appliance, is another name for DPA.

HOST—may be at least one computer or networks of computers that runs at least one data processing application that issues I/O requests to one or more storage systems; a host is an initiator with a SAN;

HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit;

PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system;

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side;

WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO.

VIRTUAL VOLUME: may be a volume which is exposed to host by a virtualization layer, the virtual volume may be spanned across more than one site DISTRIBUTED MIRROR: may be a mirror of a volume across distance, either metro or geo, which is accessible at all sites.

BLOCK VIRTUALIZATION: may be a layer, which takes backend storage volumes and by slicing concatenation and striping create a new set of volumes, which serve as base volumes or devices in the virtualization layer MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where all write and read IOs intercepted by the splitter are failed to the host, but other SCSI commands like read capacity are served.

GLOBAL FAIL ALL MODE: may be a mode of a volume in the virtual layer where all write and read IOs virtual layer are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

As used herein, the term storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image.

A detailed description of one or more embodiments of the disclosure is provided below along with accompanying figures that illustrate the principles of the disclosure. While the disclosure may be described in conjunction with such embodiment(s), it should be understood that the disclosure is not limited to any one embodiment. On the contrary, the scope of the disclosure may be limited only by the claims and the invention encompasses numerous alternatives, modifications, and equivalents. For the purpose of example, numerous specific details may be set forth in the following description in order to provide a thorough understanding of the present disclosure. These details are provided for the purpose of example, and the present disclosure may be practiced according to the claims without some of these specific details. For the purpose of clarity, technical material that is known in the technical fields related to the disclosure has not been described in detail so that the present disclosure is not unnecessarily obscured.

It should be appreciated that the present disclosure may be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the disclosure may take, may be referred to as techniques. In general, the order of the steps of disclosed processes may be altered within the scope of the disclosure.

An embodiment of the invention will be described with reference to a data replication/synchronizing system in the form of a system configured to store and replicate files, but it should be understood that the principles of the disclosure may not limited to this configuration. Rather, they may be applicable to any system capable of storing, replicating, synchronizing and handling various types of objects, in analog, digital, or other form. Although terms such as document, file, object, etc. may be used by way of example, the principles of the disclosure are not limited to any particular form of representing, replicating and storing data or other information; rather, they may be equally applicable to any object capable of representing information.

In certain embodiments, systems, processes, and methods may be discussed herein for enabling data synchronization by replicating/backing-up data. In some embodiments, Recover Point for VMs may replicate a virtual machine at a hypervisor level, that may allow replication at a per VM level. In certain embodiments, per VM replication for other hypervisors such as a HyperV and a KVM may be enabled. In some other embodiments, hypervisors may use a clustered files system and may store a virtual disk as files in the file system. Some example embodiments of such file systems may include VMware's VMFS® and Microsoft CSVFS®.

In an embodiment, recover point for virtual machines (VM) may be a simple, efficient operational and disaster recovery solution for virtualized applications in VM environments. In a further embodiment, recover point may deliver local and remote hypervisor-based replication, continuous data protection for per-VM recovery to any point in time, and built-in automated disaster recovery orchestration.

In one embodiment, recover point (EMC® Recover Point) for VMs may be a fully virtualized hypervisor-based replication and automated disaster recovery solution. In a further embodiment, recover point may be highly integrated into a VM cloud management software (VMware). In a further embodiment, Virtual Recover Point Appliances (vRPAs) may be easily installed on existing servers (for example ESXi®) and may have flexible deployment configurations. In a further embodiment, splitters (such as ESXi splitters) may reside on servers with protected workloads that may allow replication and recovery at the virtual disk (VMDK and RDM) granularity level. In a further embodiment, since the I/O splitter may reside within the vSphere hypervisor, recover point for VMs may replicate VMs to and from any storage array supported by a VM system: SAN, NAS, DAS, and vSAN.

In some other embodiments, controlling de-duplication abilities while replicating at a single VM level may be highly advantageous. In certain embodiments, controlling backend array de-duplication abilities may be performed to achieve more efficient first time initialization. In one embodiment, a backend storage array may contain an API for obtaining a signature (i.e. a hash or a hash value) of a block based on an offset. In a certain embodiment, a hash may be obtained by an API that a storage array may provide.

In one embodiment replicating may begin for a virtual machine on a production site. In a further embodiment, on a replica site virtual disk may be created for each virtual disks that may be replicated. In a further embodiment, a virtual disk on a replica site may be synchronized and/or re-synchronized with a virtual disk on a production site. In a further embodiment replication may be performed based on cloning a virtual disk. In an example embodiment, there may be a base for an application that may be required to be replicated/synchronized. In a further example embodiment, a clone operation may use Xcopy or ODX commands. In a further embodiment, replication/synchronization may or may not begin on use of these commands.

In one embodiment, a snapshot of a clustered file system containing virtual disks may be created on both a production site and a replica site. In a further embodiment, a clustered file system for a VM performing the replication/synchronization (i.e. a vRPA) may be mounted of a production site and a replica site. In a further embodiment, locations on which a virtual disk exists may be parsed. In a further embodiment, using a backend storage array API hash values for locations in a file describing a volume may be obtained. In a further embodiment, hash values on a production site and a replica site may be compared. In a further embodiment, locations which may be different between the volumes between a production site and a replica site may be synchronized by sending/transmitting data.

In a further embodiment, a traditional replication techniques may be used in a snapshot shipping mode. In a further embodiment, when a next/subsequent snapshot may be shipped/transmitted, a check may be made for changed locations. In a further embodiment, backend storage may support a command that may write/read data by a hash value. In many embodiments, a hash value may correspond to an identifier for a deduplicated piece of data that is references multiple times but stored once. In a further embodiment, hash values may be transmitted and may be applied to a disk on a replica site. In a further embodiment, only a portion of a disk block may have changed and comparing hashes may be used to check which blocks may have changed.

Embodiments of the present disclosure may be related to a system, a computer program product and a method for efficiently replicating a VMDK stored on a duplicated storage. In one embodiment, a separate hardware device or software application may be configured to perform synchronization between a production site virtual machine disk (VMDK) and a replica site VMDK. In a further embodiment a combination of hardware and software may be used to perform synchronization of a production site VMDK with a replica site VMDK. In a further embodiment, a mapping may be obtained between a virtual machine disk (VMDK) block and a logical unit block on which the VMDK block may be stored on a production site. In a further embodiment, a hash value for VMDK blocks may be obtained from a de-duplicated storage at the production site that may be based on a mapping between VMDK blocks and LU blocks. In a further embodiment, hash values read may be used for resynchronizing VMDK blocks at a production site with VMDK blocks at a replica site. In a further embodiment, a mapping may be obtained between a VMDK and a Logical Unit (LU), and the mapping may be maintained in a table such as a lookup table. In a further embodiment, a hash value may be obtained from a backend block storage array.

In a further embodiment, a virtual machine on a replica site may be created by using a template having similar VMDK blocks to the VMDK blocks of a VM at the production site. In a further embodiment, similar VMDK blocks may indicate VMDK block comprising same offsets of a virtual disk having a same hash. In a further embodiment, an offset may be a location where VMDK blocks are stored in a VMDK. In a further embodiment, VMDK may be a block device.

In one embodiment, a mapping of a VMDK to VMDK blocks is performed. In a further embodiment, mapping of a VMDK to VMDK blocks may include creating a snapshot of a logical unit containing a file system on which the VMDK reside at a production site. In a further embodiment, mapping a snapshot of a logical unit to a VM at a production site may be performed. In another embodiment, parsing a VM at a production site may be performed. In certain embodiments, a mapping between a virtual machine disk (VMDK) block and a logical unit block on which the VMDK block may be stored at a production site may be obtained. In a further embodiment, obtaining a hash value of a VMDK block from a de-duplicated storage at the production site may occur.

In one embodiment, storage on a replica site may allow writing data to an offset of a virtual disk that may be based on a hash value. In a further embodiment, a VMDK which may be fully allocated may be provisioned on a replica site. A further embodiment may include creating a snapshot of a replica LU containing a VMFS that may contain a replica VMDK. An alternative embodiment may include mapping a snapshot on a replica site to a virtual host that may include parsing a VMFS. A further embodiment may include obtaining an offset in blocks where VMDK blocks may reside. A further embodiment may include reading a hash from a production site. A further embodiment may include writing data matching with a hash value directly to a storage LU on a replica site for offsets that may relate to a replica VMDK. A further embodiment may include a command in the backend de-duplication storage that may get a hash value and an offset to a disk. In an embodiment, a hash value may exist in a de-duplication storage. In a further embodiment, data matching hash value may be written to storage. In a further embodiment, a command may send a return message that the hash value may not be found, in which case full data from the production site may need to be copied.

In certain embodiments, the current disclosure may enable a write by hash command, where data on a replication site may be written by sending a hash value to a deduplication device where hash and data corresponding to the hash already exists on the replication device. In some embodiments, when receiving a hash value corresponding to data that already exists on a device, a reference counter to the data may be incremented and the hash or pointers may be written in place of writing the data corresponding to the hash.

Reference is now made to FIG. 1, a simplified illustration of an exemplary data protection system 100, in accordance with an embodiment of the present disclosure. As illustrated in FIG. 1 are two sites; Site I, which is a production site, and Site II, which is a backup site. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time. During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present disclosure. In accordance with an embodiment of the present disclosure, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links. In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present disclosure, storage system 108 exposes a logical unit 136, designated as LU A, and storage system 120 exposes a logical unit 156, designated as LU B.

In an embodiment of the present disclosure, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present disclosure, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present disclosure, host device 104 identifies LU A and generates a corresponding host device 140, designated as Device A, through which it can access LU A. Similarly, host computer 116 identifies LU B and generates a corresponding device 160, designated as Device B.

In an embodiment of the present disclosure, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail herein below, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present disclosure, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units, and as a target DPA for other logical units, at the same time.

In accordance with an embodiment of the present disclosure, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present disclosure, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present disclosure, protection agents communicate with their respective DPAs by sending SCSI commands over fiber channel.

In an embodiment of the present disclosure, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present disclosure, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of all write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

Figure 2:
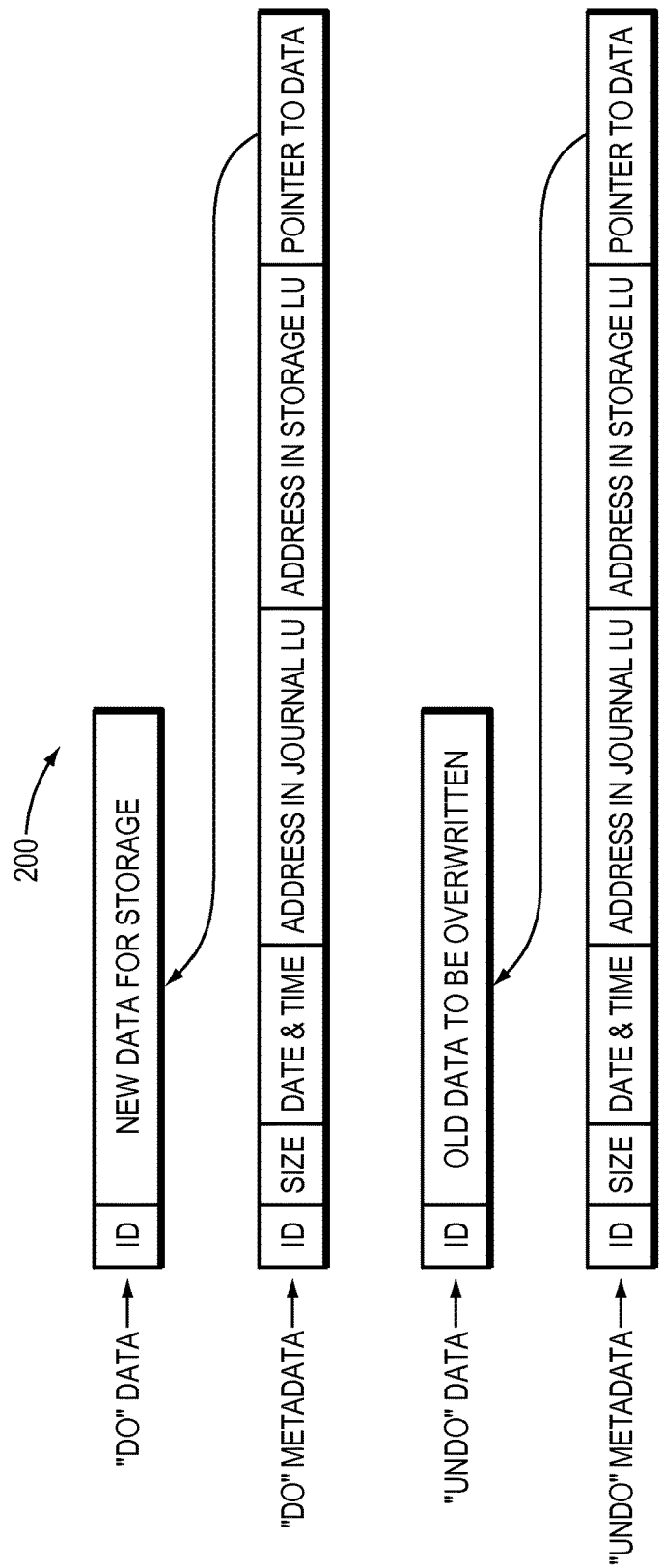
FIG. 2 is an exemplary block diagram of a write transaction for a journal according to an embodiment of the present disclosure.

As described hereinabove, in accordance with an embodiment of the present disclosure, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B. In accordance with an embodiment of the present disclosure, target storage system 120 exposes a logical unit 176, referred to as a "journal LU", for maintaining a history of write transactions made to LU B, referred to as a "journal". Alternatively, journal LU 176 may be striped over several logical units, or may reside within all of or a portion of another logical unit. DPA 124 includes a journal processor 180 for managing the journal. Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIG. 2, journal entries include four streams, two of which are written when write transaction are entered into the journal, and two of which are written when write transaction are applied and removed from the journal. Reference is now made to FIG. 2, which is a simplified illustration of a write transaction 200 for a journal, in accordance with an embodiment of the present disclosure. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
 one or more identifiers;
 a time stamp, which is the date & time at which the transaction was received by source side DPA 112;
 a write size, which is the size of the data block;
 a location in journal LU 176 where the data is entered;
 a location in LU B where the data is to be written; and
 the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments. Thereafter the DO data is written into the DO stream, and the pointer to the appropriate first or last segment is updated. Freeing of segments in the ordered list is performed by simply changing the beginning or the end pointer. Freed segments are returned to the segment pool for re-use. A journal may be made of any number of streams including less than or more than 5 streams. Often, based on the speed of the journaling and whether the back-up is synchronous or a synchronous a fewer or greater number of streams may be used.

In one embodiment, a delta marker stream may contain the locations that may be different between the latest I/O data which arrived to the remote side (the current remote site) and the latest I/O data which arrived at the local side. In particular, the delta marking stream may include metadata of the differences between the source side and the target side. For example, every I/O reaching the data protection appliance for the source 112 may be written to the delta marking stream and data is freed from the delta marking stream when the data safely arrives at both the source volume of replication 108 and the remote journal 180 (e.g., DO stream). Specifically, during an initialization process no data may be freed from the delta marking stream; and only when the initialization process is completed and I/O data has arrived to both local storage and the remote journal data, I/O data from the delta marking stream may be freed. When the source and target are not synchronized, data may not be freed from the delta marking stream. The initialization process may start by merging delta marking streams of the target and the source so that the delta marking stream includes a list of all different locations between local and remote sites. For example, a delta marking stream at the target might have data too if a user has accessed an image at the target site.

The initialization process may create one virtual disk out of all the available user volumes. The virtual space may be divided into a selected number of portions depending upon the amount of data needed to be synchronized. A list of 'dirty' blocks may be read from the delta marker stream that is relevant to the area currently being synchronized to enable creation of a dirty location data structure. The system may begin synchronizing units of data, where a unit of data is a constant amount of dirty data, e.g., a data that needs to be synchronized.

The dirty location data structure may provide a list of dirty location until the amount of dirty location is equal to the unit size or until there is no data left. The system may begin a so-called Ping-Pong process to synchronize the data. The process may transfer the differences between the production and replication site to the replica.

Data Replication/Data Synchronization

Figure 3:
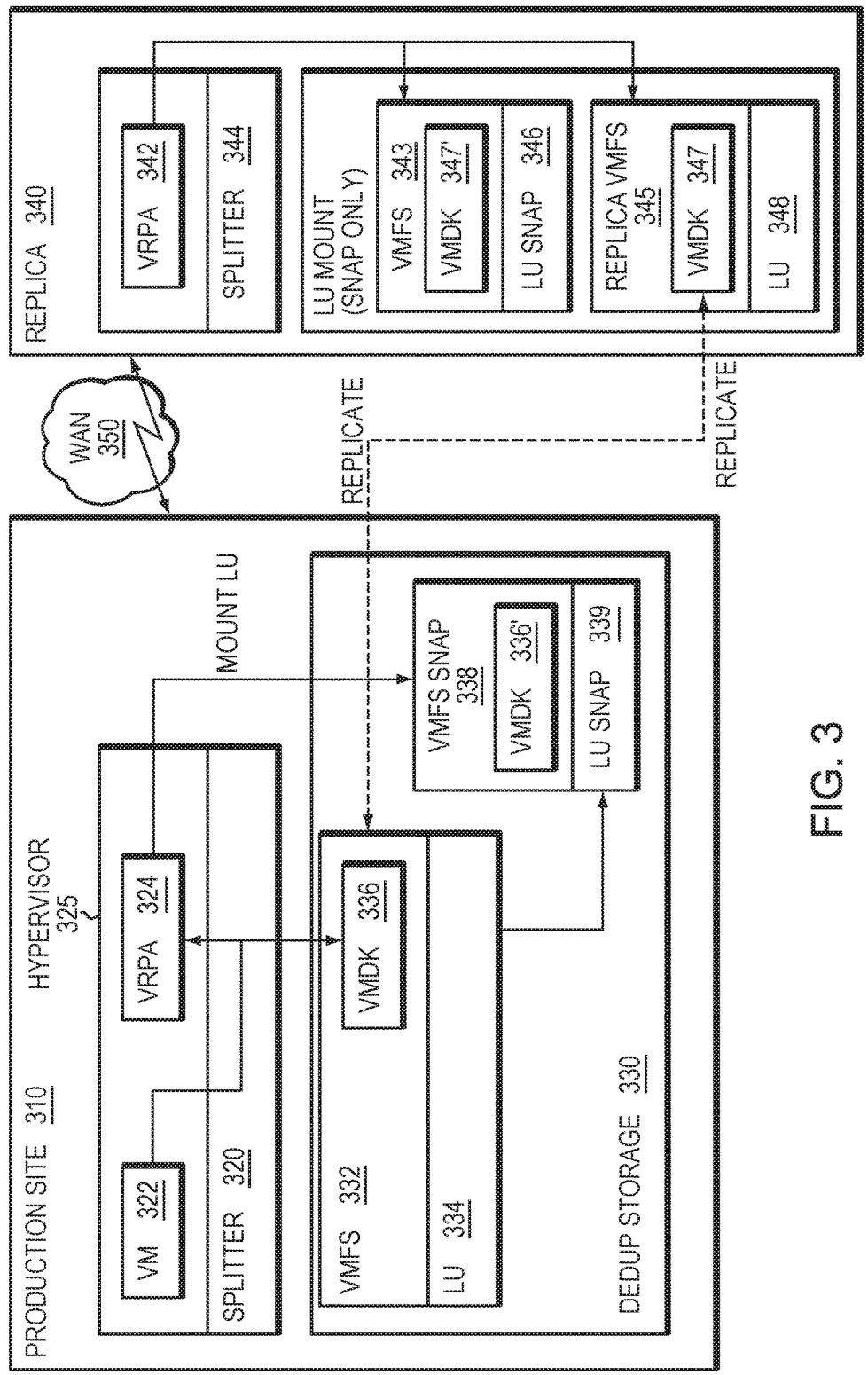
FIG. 3 is a simplified illustration of FIG. 1 for a secure data replication system replicating VMs in accordance with an embodiment of the present disclosure.

Reference is now made to FIG. 3, which is a simplified illustration of FIG. 1 for a data replication/synchronization system replicating/synchronizing VMs in accordance with an embodiment of the present disclosure.

Production site 310 is coupled to replica site 340 over a WAN 350, and is configured to support synchronous and asynchronous data replication/synchronization. Production site 310 comprises splitter 320 running inside hypervisor 325. Hypervisor 325 comprises VM 322 and vRPA 324. IOs from the VM 322 on production site 310 are split by splitter 320 and transmitted to vRPA 324 and VMDK 336. vRPA 324 sends IOs to remote vRPA 342, which creates replica copy VMDK 347 and journal (not shown in FIG. 3). Production site 310 further comprises a de-duplication storage (DDS) 330, which comprises a Logical Unit (LU) 334 and a VMFS 332 which resides on top of LU 334. File system VMFS 332 comprises file VMDK 336. DDS 330 comprises a snapshot of LU 334, illustrated as LU SNAP 339. The snapshot of LU 334, LU SNAP 339, thus includes snapshot of VMFS 332, illustrated as VMFS SNAP 338, which also includes a snapshot of VMDK 336, illustrated as VMDK 336', which is a point in time copy of VMDK 336. VMFS 332 is referred to as a backend disk of VM 322.

Replica site 340 also comprises a splitter 340 and a vRPA 342. In this configuration vRPA 342 receives IOs from vRPA 324 on the source site. Splitter 344 is installed on replica site 340, and is used in the case of a failover. Replica site 340 further comprises a replica VMFS 345 residing on top of a LU 348, and replica VMFS 345 further includes file VMDK 347. Replica site 340 further comprises a LU SNAP 346, which is snapshot of LU 348, and VMFS 343 which resides on top of LU SNAP 346. VMFS 343 further comprises file VMDK 347', which is a copy of VMDK 347. The dotted line connecting VMDK 336 and VMDK 347 indicates that VMDK 336 is synchronized/resynchronized with VMDK 347.

VMDK 336 on production site 310 is replicated/synchronized with VMDK 347 on the replica site 340, thereby synchronizing data on VMDK 336 at production site 310 with VMDK 347 at replica site 340, and will be discussed in detail below.

LU SNAP 339 is exposed to vRPA 324, which parses the VMFS 332 and determines/ascertains the VMDK 336' files in VMFS SNAP 338. LU SNAP 346 is exposed to vRPA 342, which parses the replica VMFS snapshot 343 and creates replica VMDK snapshot 347'.

In accordance with some embodiments of the present disclosure, VM on replica site 340 is created using a template having similar VMDK blocks to the VMDK blocks in VMDK 336 on production site 310. In order to create a similar replica a base template that VM 322 was created from may be used or a template with similar OS and applications may be chosen to create a similar replica.

In this embodiment, network bandwidth is saved when initializing VMDK 336 and replica VMDK 347, which is creating a first copy of VMDK 336 in VMDK 347.

In a further embodiment, since VMDKs may be similar, all data may not need to be transferred from the production site to the replica site thereby saving network bandwidth. In a further embodiment since hash values may be read from a production storage array and not a full data storage array, storage bandwidth on both a production storage and a replica storage may be saved. VMDK 336 and VMDK 347 are virtual disks, and are comprised of address space of blocks, from an offset value of "0" to an offset value of "n" where "n" is the number of blocks in the virtual disk.

Blocks that are different between VMDK 336 at the production site and VMDK 347 at the replica site need to be copied from VMDK 336 to VMDK 347. If the disks (VMDK 336 and VMDK 347) are similar then most blocks may be identical. When the blocks in VMDK 336 and VMDK 347 are identical, hash values created for the blocks on production site 310 and replica site 340 are identical. Blocks regions that have different hash values on production sire 310 and replica site 340 are copied from production site 310 to replica site 340.

Reading blocks of data in VMDK 336 and VMDK 347 and creating hashes for this data may be a resource intensive task. If the storage is de-duplicated, de-duplicated storage (DDS) 330 already contains hash values for each of the blocks in VMDK 336 and VMDK 347, and DDS 330 may allow reading hash values directly from DDS 330 without reading the full data in VMDK 336 and VMDK 347. This may enable faster comparison of hash values as the hash values on the deduplicated store exist and do not need to be calculated, as it may also save the need to read data from disk devices thus saving time.

In order to read the hash values of VMDK 336 and VMDK 347 from DDS 330, it is necessary to know where the blocks of VMDK 336 and VMDK 347 are stored in LU 334 and LU 348.

For example, a block with an offset "0" of VMDK 336 may be stored in an offset "x" in LU 334 and block with an offset "0" in VMDK 347 may be stored in an offset "y" in LU 348, since the VMDK is a file in a file system that may be stored on the LU and thus the mapping may not direct.

In order to obtain the mapping a snapshot of LU 334, which exposes LU Snap 339 to vRPA 324, vRPA 324 parses VMFS snapshot 338 and obtains a mapping of the blocks in VMDK 336'. For example, it may detect block "0" in VMDK 336' is mapped to an offset "x0" in LU Snap 339, and offset "1" in VMDK 336' is mapped to offset "x1" in LU Snap 339. Hash values for offset "x0" and "x1" are read in LU Snap 339 from DDS 330 without reading the data. A similar mapping may be performed on replica site 340, i.e. taking snapshot of LU 348, (LU SNAP 346), mounting LU SNAP 346 to vRPA 342, parsing VMFS 343, obtaining a mapping of VMDK 347' and reading hash values from LU SNAP 346 based on the offsets parsed from VMDK 347'.

If the hash values mapped are identical these location of VMDK 336 and VMDK 347 do not need to be synchronized, else the offset of the hash values from VMDK 336 will be marked for synchronization with VMDK 347.

In a further embodiment, hash values may be obtained from a back end storage. In one embodiment, a hash value may be generated using techniques such as trivial hashing, perfect hashing, uniformly distributed data hashing, SHA, variable-length data hashing, rolling hash, universal hashing, checksum hashing, and/or cryptographic hashing. In other embodiments, other techniques available may be used to generate a hash value.

In one embodiment, at VM may be configured to generate IOs. In a further embodiment, a splitter may be configured to intercept IOs and split IOs to be transmitted across different appliances. In a further embodiment, a splitter may be configured to write logs to a journal. In a further embodiment, a journal may be configured to perform a number of functions such as read logs, undo logs, redo logs. In a further embodiment, a VMDK on a replica site may be updated based on the logs in a journal.

In one embodiment, a VMDK may be created on a replica site. In a further embodiment, new IOs at a production site may be tracked. In a further embodiment, a snapshot of a LU containing a VMFS on a replica site may be created. In a further embodiment, a VMDK at a production site may be mapped to VMDK blocks, and may include creating a snapshot of a LU that may contain a file system on which a VMDK resides. In a further embodiment, from a snapshot at a production site and a snapshot at a replica site a mapping from VMDK to LU blocks may be obtained. In a further embodiment, hash values at a production site may be read.

In one embodiment, an algorithm may be provided for arrays that may support a "write by signature" command In another embodiment, an algorithm may be used that may not support "write by signature." In one embodiment, hash values for which "write by signature" fails may be added to a block list or synchronization list. In a further embodiment, this may move the portion of the "write by signature" data to another location to be synchronized at a later point in time. In one embodiment, hash values on both sides, the production site and the replica site may be read and compared.

In one embodiment, a VMDK on a replica site may be created from a template that may be similar to a VMDK on a production site. In a further embodiment, hash values from a production site and a replica site may be read. In a further embodiment, locations where the hash values do not match may be added to a block list. In a further embodiment, locations that may be marked in a block list may be resynchronized.

In one embodiment, a splitter on production site and a splitter on replica site may be a hardware element or a software element or a combination thereof. In a further embodiment, a splitter may reside inside a host, inside an array, inside a VM, outside a VM or in a hypervisor. In a further embodiment, a splitter may be configured to split IOs in an original direction to a VM and in the direction of a vRPA. In a further embodiment, splitter intercepts IOs, and instead of VMs, host vRPAs on a production site may be configured to transmit data to VMs on the production site and a vRPA on a replica site. In a further embodiment, a vRPA may be configured to acknowledge IOs, and then send/transmit IOs in the original direction to a VMDK. In a further embodiment, a VMDK may exist/reside on a VMFS snapshot. In yet a further embodiment a vRPA may be advantageously configured to perform replication of a VM.

In one embodiment, file systems may be accessed from multiple hosts without corrupting data that may be stored/available on the file systems. In a further embodiment, VMFS on a production site may be a data store. In a further embodiment, a VMFS on a production site may be a location where user VMs may be stored as a file, such as a VMDK. In one embodiment, multiple VMDKs may exist in a VMFS on a production site. In a further embodiment, a VMDK on a production site may be replicated by updating a VMDK on a replica site. In one embodiment, data in a VMDK on a production site may be read and initialized. In a further embodiment, after initialization of a VMDK, hash values or signature associated with the data (on VMDK) may be obtained. In a further embodiment, hash values obtained for a production site VMDK may be compared with a hash value on a replica site VMDK. In a further embodiment, on negative determination of a hash value for data on a VMDK on a production site, data that may be having negatively determined values (non-identical data) may be synchronized by transmitting such non-identical data to a VMDK on a replica site.

In one embodiment, locations that may be identical in a VMDK on a production site and a VMDK on a replica site may be identified. In a further embodiment, only those locations that may not be identical in VMDKs on a production site and a replica site may be synchronized (resynchronized). In a further embodiment, before synchronization, a snapshot of a VMFS and a snapshot of a LU may be created on a production site. In a further embodiment, a snapshot may be a point in time copy of a VM associated with a VMFS. In a further embodiment, a snapshot of replica VMFS and a snapshot of a LU on a replica site may be created at the same time as creating a snapshot of a VMFS and LU on a production site. In a further embodiment, LUs on a production site and a replica site may be mounted on a vRPA.

In one further embodiment, a VMFS may include a number of files. In a further embodiment, files/data on a VMFS may be parsed to determine location where a VMDK may exist in a VMFS. In a further embodiment, a hash value may be obtained for a VMDK at a production site and may be compared with a hash value for a VMDK from a replica. In a further embodiment, hash values may be compared between a production site and a replica site. In a further embodiment, it may be determined that the data may not be identical between a VMDK on production and a VMDK on replica based on the comparison of hash values. In a further embodiment, when it may be determined that data is not identical on VMDKs between a production side and a replica site, the VMDK on production site and the VMDK on replica site may need to be synchronized. In a further embodiment, after synchronization, a VMDK on production site may be the same as a VMDK on replica site.

Figure 4:
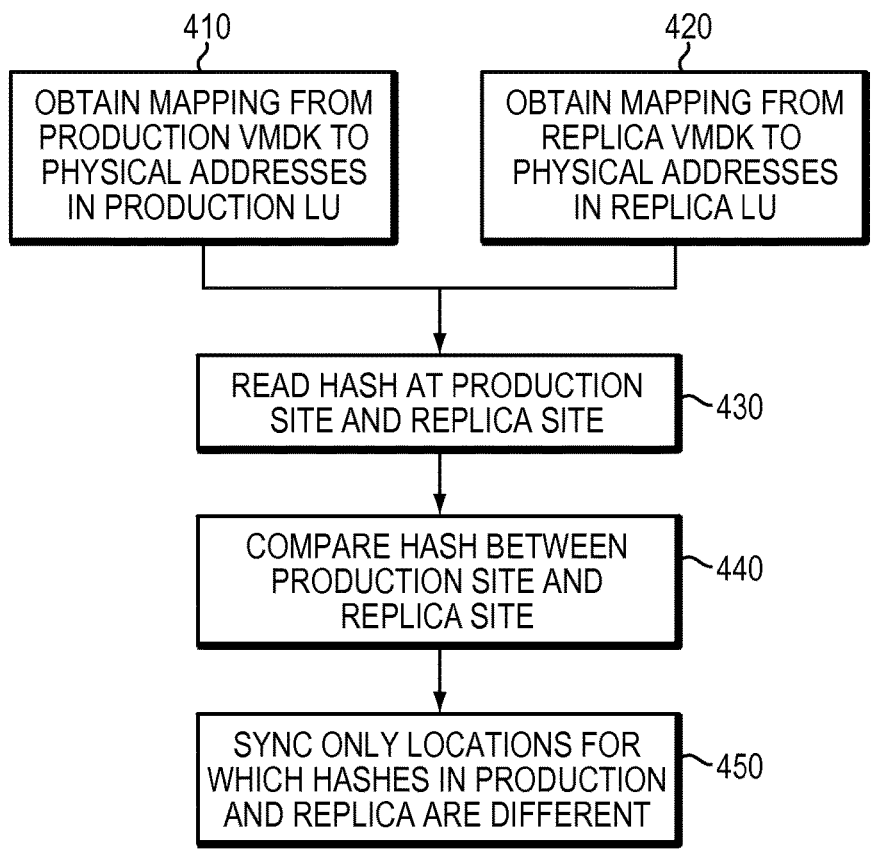
FIG. 4 is a simplified flowchart of a method for synchronization, in accordance with an embodiment of the present disclosure.

Reference is now made to FIG. 4, which is a simplified flowchart of a method for synchronization, in accordance with an embodiment of the present disclosure. A mapping is obtained from a VMDK on a production site to a physical address on a LU on the production site (Step 410). At another instant of time, a mapping from a VMDK on a replica site to a physical address on a LU on the replica site is obtained (Step 420). Hash values for data in a VMDK at the production site and a VMDK at the replica site are read from DDS based on the mapping of hash values. Hash values matching the LU data are read. (Step 430). Hash values that are read for VMDK at production site and VMDK at replica site are compared (Step 440). Comparison of hash values identifies differences in data between the VMDK on the production site and the VMDK on the replica site. Data (offset locations) for which hash values in the production site VMDK are different from the hash values on the replica site VMDK are synchronized (Step 450).

In one embodiment, steps 410 and 420 may be performed simultaneously. In an alternate embodiment, steps 410 and 420 may be performed at different point of time.

In one embodiment, mapping of VMDK on a production site and a VMDK on a replica site may be made to a respective physical address on a LU on the respective site. In a further embodiment, a mapping between a VMDK and a LU on a respective site may be obtained before an attempt may be made to synchronize data between a production site and a replica site. In one embodiment, a hash value may be generated using techniques such as trivial hashing, perfect hashing, uniformly distributed data hashing, SHA, variable-length data hashing, rolling hash, universal hashing, checksum hashing, and/or cryptographic hashing. In other embodiments, other techniques available may be used to generate a hash value. In a further embodiment, hash values for VMDK may be obtained from a DDS. In a further embodiment, hash values for VMDK may be obtained from back-end storage. In an example embodiment, hash values may be stored in a table, such as a simple look-up table or hash functions accelerate table or database lookup.

Figure 5:
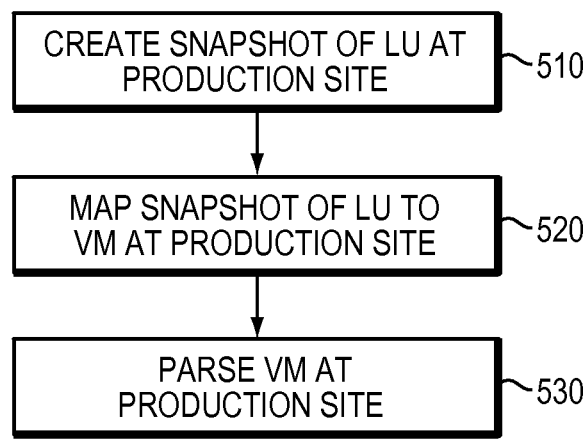
FIG. 5 is a simplified flowchart of a method of parsing a VM at the production site, in accordance with an embodiment of the present disclosure.

Reference is now made to FIG. 5, which is a simplified flowchart of a method of parsing a mapping of a VM (VM 322) volume to locations in an underlying LU at the production site, in accordance with an embodiment of the present disclosure. A snapshot of a LU at the production site is created (Step 510). Snapshot of the LU at the production site is mapped to a vRPA (vRPA 324) on the production site (Step 520). VM at the production site is then parsed (Step 530).

In one embodiment the VMFS is parsed to locate a VMDK in a VMFS at the production site. In one embodiment, files/data on a VMFS may be parsed to determine locations (offset locations) where a VMDK may exist in a LU containing a VMFS. In a further embodiment, a similar methodology may be executed at a replica site.

Figure 6:
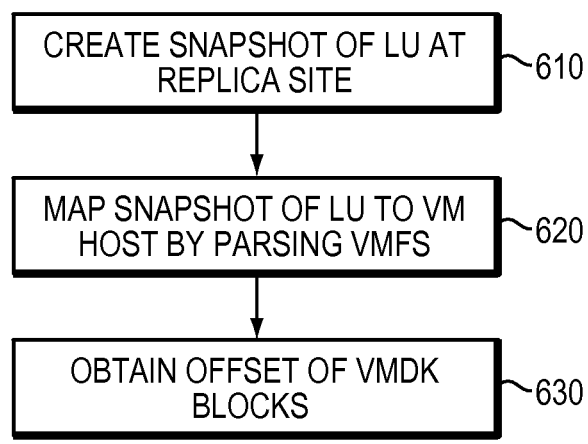
FIG. 6 is a simplified flow chart for obtaining offsets of VMDK blocks in accordance with an embodiment of the present disclosure.

Reference is now made to FIG. 6, which is a simplified flow chart for obtaining offsets of VMDK blocks in accordance with an embodiment of the present disclosure. A snapshot of a LU at the replica site is created (Step 610). Snapshot of the LU is mapped to a vRPA (vRPA 342) host by parsing a VMFS (Step 620). Offsets (locations) for VMDK blocks in a VMFS are obtained by parsing the VMFS/VMDK (Step 630).

In one embodiment, offset may be considered as a location where VMDK blocks are stored in a LU.

Figure 7:
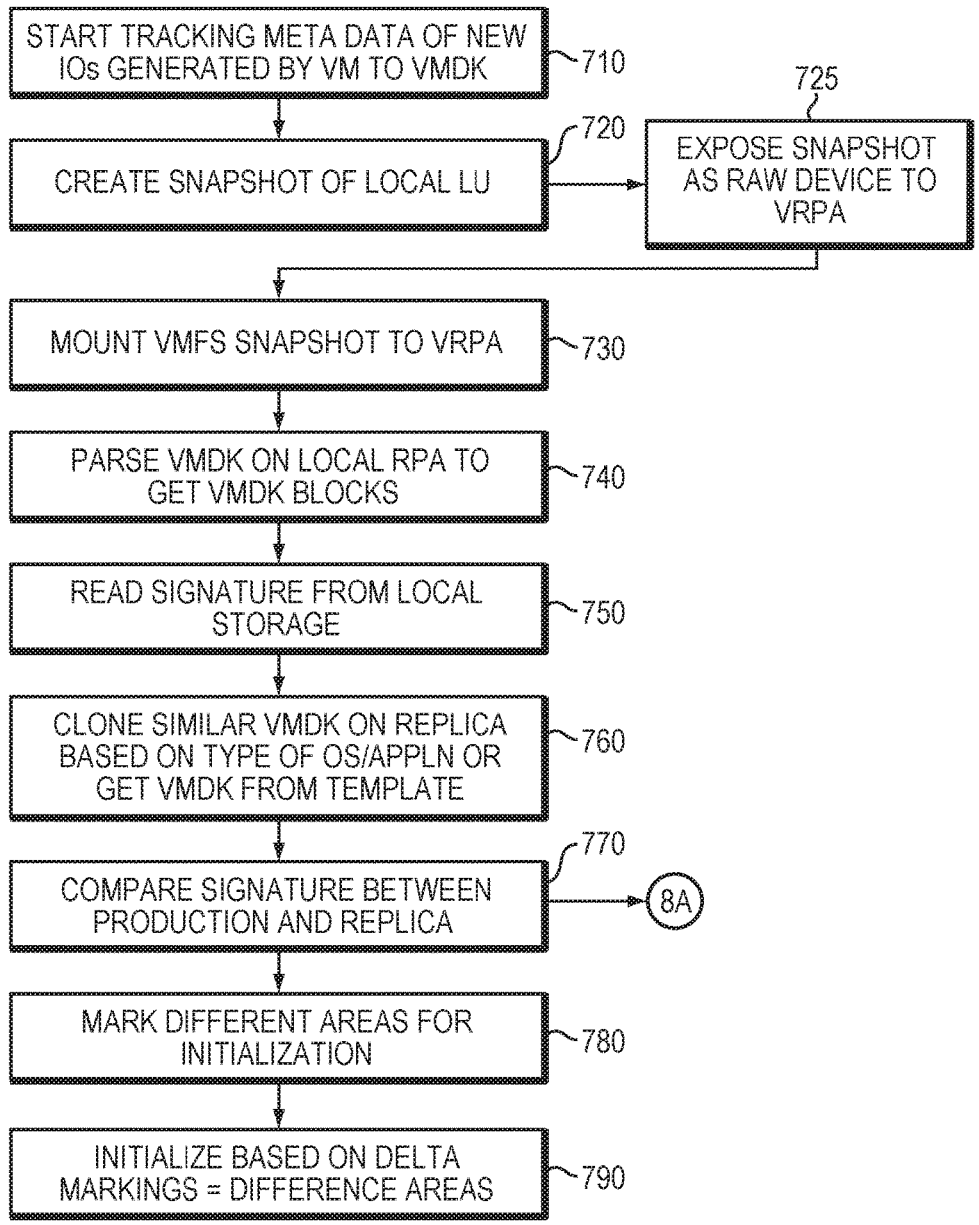
FIG. 7 is a simplified flowchart for Remote storage support by Reading block signatures and Writing block signatures, in accordance with an embodiment of the present disclosure.

Reference is now made to FIG. 7, which is a simplified flowchart for remote storage support by reading block signatures and in an array that does not support "write by signature," in accordance with an embodiment of the present disclosure. Metadata of new IOs generated by a VM to a VMDK are tracked (Step 710). A snapshot of the Logical Unit (LU) is created (Step 720). Snapshot of the LU created is exposed as a raw device to the vRPA (Step 725). A VMFS snapshot is mounted to a vRPA (Step 730). A VMDK on the local RPA is parsed to obtain VMDK blocks (Step 740). Hash values (signatures) from a local storage (LU) are obtained and read, where the hashes are read using the DDS read hash command which reads the hash of an offset without reading the data from the device. (Step 750). Based on the OS type or application or other data, a clone is created for a similar VMDK's on the replica (Step 760). Hash values of the VMDKs between the production site and the replica site are compared (Step 770), based on Step 8A (FIG. 8), which describes a method for obtaining signatures from a remote site and may be executed as discussed below in FIG. 8. Comparing the hash values of VMDKs between the production site and the replica site is performed (Step 770), and from the comparison, areas having different hash values in the VMDK are marked for initialization (Step 780). Based on the differences of the hash values found in the comparison, the delta (the difference areas) in the VMDK are identified and marked, and initialization is performed on the delta marked areas along with the meta data of changes to locations tracked by the splitter (Step 790).

Figure 8:
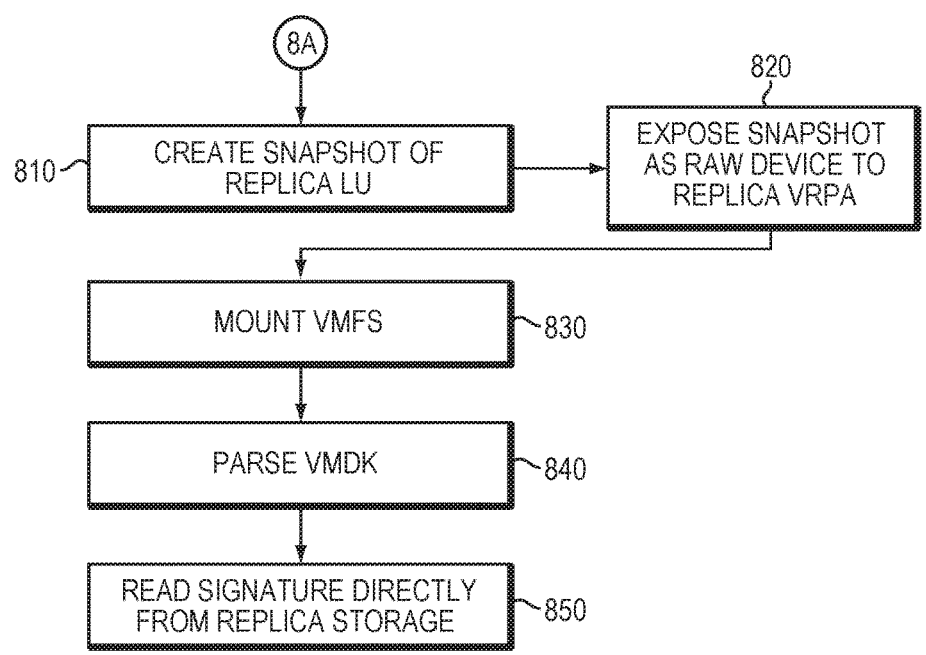
FIG. 8 is a simplified flowchart for Remote storage support by Reading block signatures and Does not support Writing block signatures, in accordance with an embodiment of the present disclosure.

Reference is now made to FIG. 8, which is a simplified flowchart for reading signatures for the method of FIG. 7, in accordance with an embodiment of the present disclosure, and describes a method for obtaining signatures from a remote site. To compare signatures between the VMDKs at the production site and the replica site, a snapshot of a replica LU is created (Step 810). The snapshot of the replica LU is exposed as a raw device to a replica vRPA (Step 820). VMFS on the replica site is mounted (Step 830). VMDK in the VMFS is parsed (Step 840) to find the location of the VMDK blocks, i.e., where the VMDK blocks exist in the VMDK. Hash Values are read directly from the replica storage (Step 850).

In one embodiment, replica VMDKS may be created as a thick VMDK so that a full mapping of blocks of a VMDK exist on the replica site.

Figure 9:
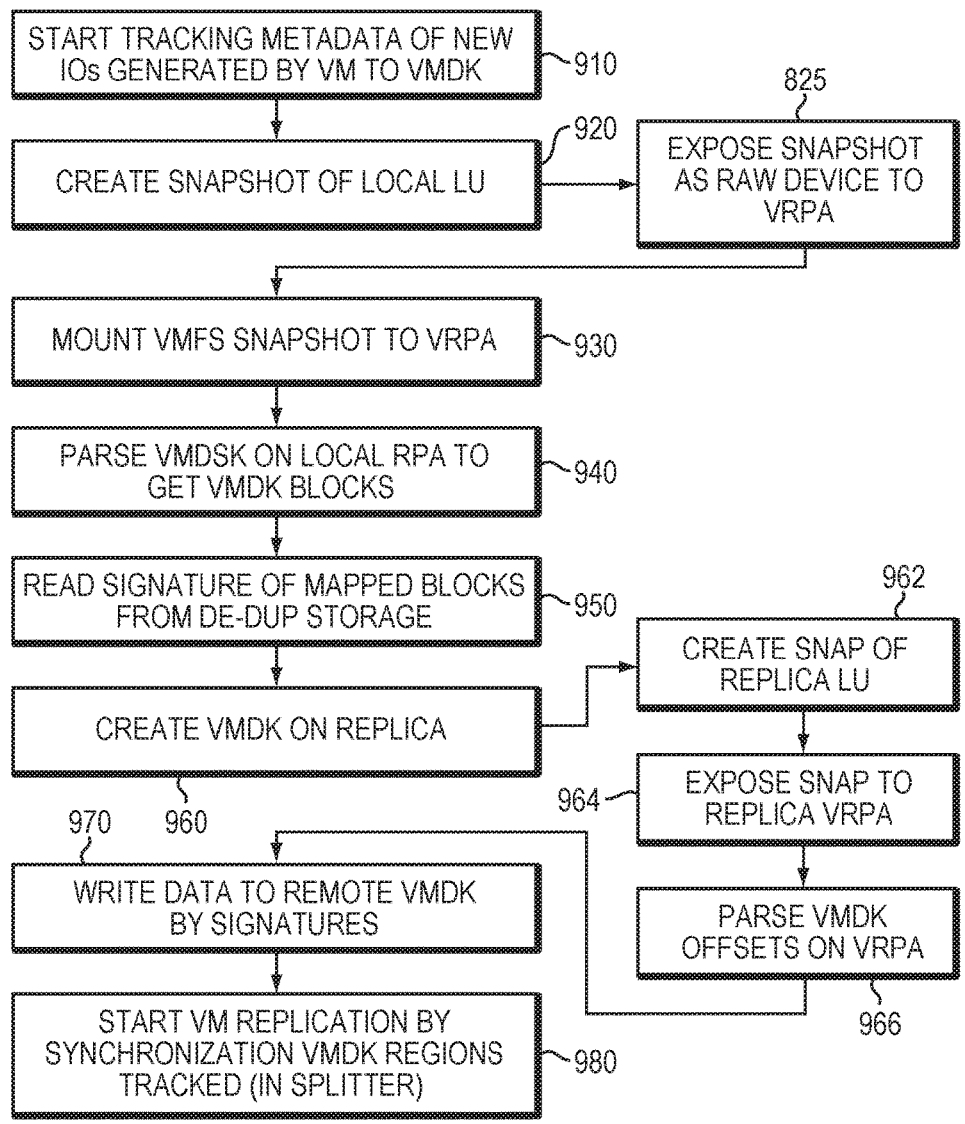
FIG. 9 is a simplified flowchart for reading signatures for the method of FIG. 9, in accordance with an embodiment of the present disclosure.

Reference is now made to FIG. 9, which is a simplified flowchart for remote storage support by reading block signatures, using the read hash command, and writing block signatures, supporting "write by signature" command, in accordance with an embodiment of the present disclosure.

Metadata of new IOs generated by a VM to a VMDK are tracked (Step 910). A snapshot of the production Logical Unit (LU) is created (Step 920). The snapshot of the LU that is created, is exposed as a raw device to a production vRPA (Step 925). A VMFS snapshot is mounted to the production vRPA (Step 930). VMDK on the local RPA is parsed to obtain VMDK blocks (Step 940). Hash values (signatures) are read for mapped blocks, wherein the hash values are obtained from a DDS using a read hash command (Step 950). A VMDK on the replica (Step 960) is created, the VMDK is created as a thick VMDK so that all the mapping from blocks to LU addresses exist. In order to write the signatures to a remote VMDK using a "write by signature" command, a snapshot of the replica LU containing the replica VMFS is created (Step 962). The snapshot is exposed as raw device to remote vRPA (Step 964). VMDK offsets are parsed on replica vRPA (Step 966), and data is written to the remote VMDK on the replica by hash values using "write by signature" by using the offsets parsed in Step 966 (Step 970), and if the "write by signature" for an offset fails then the offset is added to the block list region that needs resynchronization.

VM replication is achieved by synchronizing VMDK regions tracked in the splitter and the regions marked in block list in Step 970 (Step 980).

In one embodiment, it may be presumed that DDS arrays may have a command "write by signature," which may be receive as an input a hash value and an offset in a LU. In a further embodiment, if a hash value may exists in the DDS array, then data matching the hash values may be written to the storage at the requested offset otherwise the command may fail.

Figure 10:
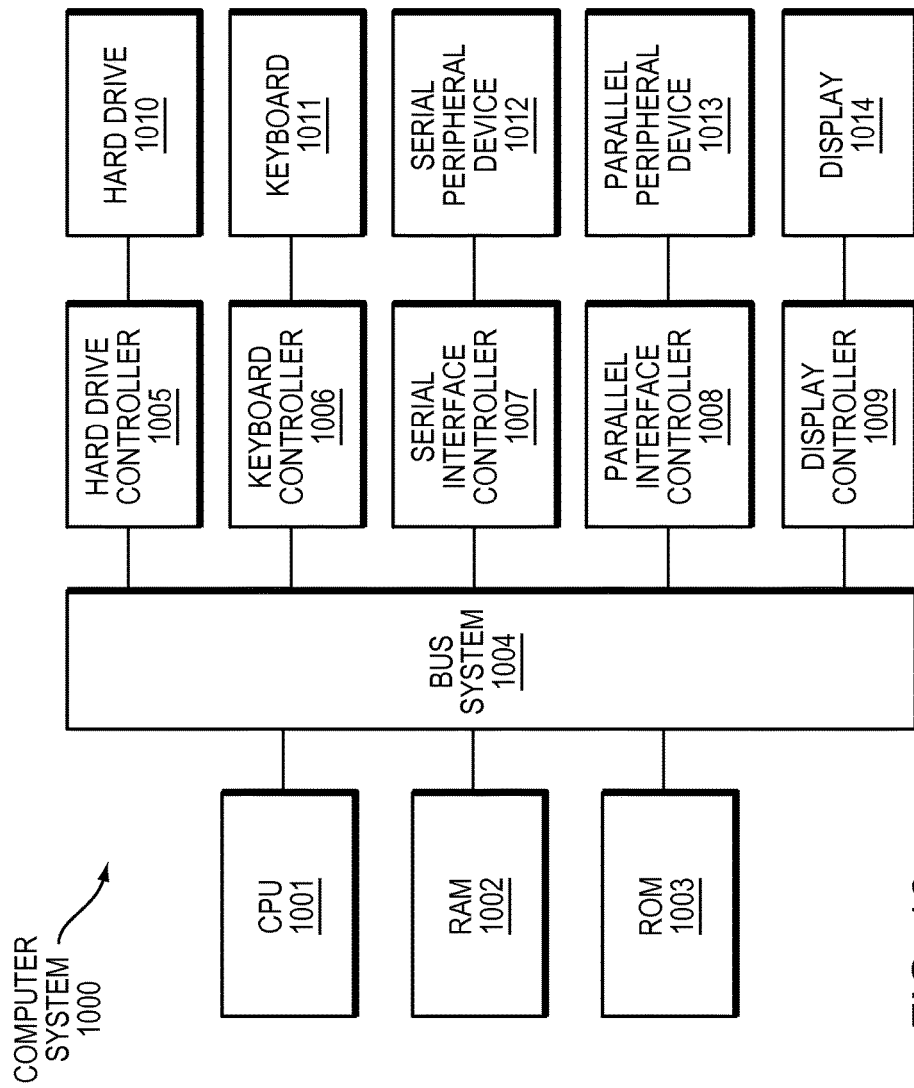
FIG. 10 is a block diagram of an exemplary apparatus according to example embodiment of the present invention.

Reference is now made to the example embodiment of FIG. 10, which illustrates an example of an embodiment of an apparatus/system 1000 that may utilize the techniques described herein, in accordance with an embodiment of the present disclosure. As illustrated in FIG. 10, the computer system 1000 includes: CPU (Central Process Unit) 1001, RAM (Random Access Memory) 1002, ROM (Read Only Memory) 1003, System Bus 1004, Hard Drive Controller 1005, Keyboard Controller 1006, Serial Interface Controller 1007, Parallel Interface Controller 1008, Display Controller 1009, Hard Drive 150, Keyboard 1011, Serial Peripheral Equipment 1012, Parallel Peripheral Equipment 1013 and Display 1014. Among above devices, CPU 1001, RAM 1002, ROM 1003, Hard Drive Controller 1005, Keyboard Controller 1006, Serial Interface Controller 1007, Parallel Interface Controller 1008 and Display Controller 1009 are coupled to the System Bus 1004. Hard Drive 1050 is coupled to Hard Drive Controller 1005. Keyboard 1011 is coupled to Keyboard Controller 1006. Serial Peripheral Equipment 1012 is coupled to Serial Interface Controller 1007. Parallel Peripheral Equipment 1013 is coupled to Parallel Interface Controller 1008. And, Display 1014 is coupled to Display Controller 1009.

The exemplary computer system 1000 is discussed only for illustrative purpose and should not be construed as a limitation on the embodiments or scope of the present disclosure. In some cases, some devices may be added to or removed from a computer system based on specific situations. For example, a computer system may be representative of a standalone system or a system of a production site, which comprises a number of hosts coupled to a source disk and a target disk. In most embodiments, a system/device may comprise a processor and a memory, such as a laptop computer, personal digital assistant, or mobile phones.

The methods and apparatus of this disclosure may take the form, at least partially, of program code (i.e., instructions) embodied in tangible non-transitory media, such as floppy diskettes, CD-ROMs, hard drives, random access or read only-memory, or any other machine-readable storage medium. In some embodiment, the program code may be loaded into and executed by a machine, such as the computer of FIG. 10, and in such instances the machine may become an apparatus for practicing the disclosure. In some other embodiment, when implemented on one or more general-purpose processors, the program code may combine with such a processor to provide a unique apparatus that operates analogously to specific logic circuits. In certain embodiments, a general purpose digital machine may be transformed into a special purpose digital machine. In certain other embodiments, a processor may be a physical processor, in other embodiments a processor may be a virtual processor.

Figure 11:
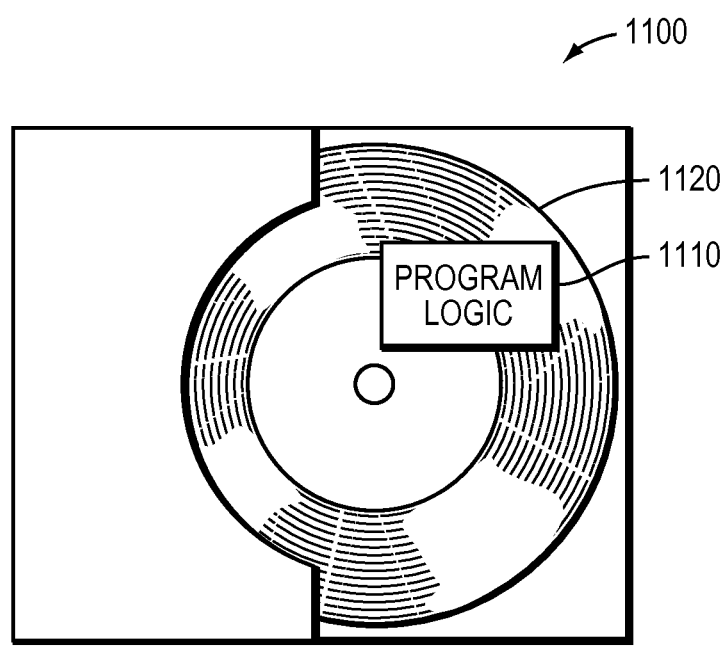
FIG. 11 is an illustration of an example embodiment of the present invention embodied in computer program code.

Reference is now made to FIG. 11, which is an example of an embodiment of a method embodied on a computer readable storage medium that may utilize the techniques described herein, in accordance with an embodiment of the present disclosure. FIG. 11 is an example of an embodiment of a method embodied on a computer readable storage medium that may utilize the techniques described herein, in accordance with an embodiment of the present disclosure. FIG. 11 shows Program Logic 1110 embodied on a computer-readable medium 1130 as shown, and wherein the Logic is encoded in computer-executable code configured for carrying out the reservation service process of this disclosure and thereby forming a Computer Program Product 1100. In one embodiment, logic may be loaded into memory and executed by processor. In a further embodiment, logic may also be the same logic 1110 on computer readable medium.

The logic for carrying out the method may be embodied as part of the aforementioned system, which is useful for carrying out a method described with reference to embodiments shown in, for example, FIGS. 1 to 9. For purposes of illustrating the present disclosure, the disclosure is described as embodied in a specific configuration and using special logical arrangements, but one skilled in the art may appreciate that the device is not limited to the specific configuration but rather only by the claims included with this specification.

In some embodiment, the method described herein (FIG. 4 to 9) may not limited to use with the hardware and software of FIG. 10; they may find applicability in any computing or processing environment and with any type of machine or set of machines that may be capable of running a computer program. In some other embodiment, the method described herein may be implemented in hardware, software, or a combination of the two. In some other embodiments, the processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. In certain other embodiment, program code may be applied to data entered using an input device to perform any of the processes described herein and may generate output information.

In some embodiments, the system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). In certain embodiment, each such program may be implemented in a high level procedural or object-oriented programming language to communicate with a computer system. In certain other embodiments, however, the programs may be implemented in assembly or machine language. In some embodiment, the language may be a compiled or an interpreted language and it may be deployed in any form, including as a stand-alone program or as a module, component, subroutine, or other unit suitable for use in a computing environment. In some other embodiment, a computer program may be deployed to be executed on one computer or on multiple computers at one site or distributed across multiple sites and interconnected by a communication network. In some other embodiments, a computer program may be stored on a non-transitory machine-readable medium that is readable by a general or special purpose programmable computer for configuring and operating the computer when the non-transitory machine-readable medium is read by the computer to perform the processes described herein. In an example embodiment, the processes described herein may also be implemented as a non-transitory machine-readable storage medium, configured with a computer program, where upon execution, instructions in the computer program cause the computer to operate in accordance with the processes. In some other embodiment, a non-transitory machine-readable medium may include but is not limited to a hard drive, compact disc, flash memory, non-volatile memory, volatile memory, magnetic diskette and so forth but does not include a transitory signal per se.

In one embodiment, the methods described herein are not limited to the specific examples described. In a further embodiment, rather, any of the method steps in FIGS. 4 to 9 may be re-ordered, combined or removed, performed in parallel or in serial, as necessary, to achieve the results set forth above.

In some embodiment, the system may be performed by one or more programmable processors executing one or more computer programs to perform the functions of the system. In some other embodiment, all or part of the system may be implemented as, special purpose logic circuitry (e.g., an FPGA (field-programmable gate array) and/or an ASIC (application-specific integrated circuit)). In some other embodiment, all or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

What is claimed is:

1. A computer implemented method comprising:
reading a signature corresponding to a portion of data on a virtual machine disk (VMDK) on a production site, wherein reading the signature includes obtaining a first mapping between a first block offset on the virtual machine disk on the production site and a second block offset on a first de-duplicated physical storage on the production site, and reading, based on the first mapping, the signature from the first de-duplicated physical storage on the production site:
sending the signature to a replication site;
obtaining a second mapping between a third block offset on a virtual machine disk on the replication site and a fourth block offset on a second de-duplicated physical disk storage on the replication site;
issuing a command to write the portion of data corresponding to the signature to the second de-duplicated physical storage on the replication site based on the second mapping;
determining, based at least in part on a result of the command, that a first set of blocks on the first de-duplicated physical storage on the production site and a second set of blocks on the second de-duplicated physical storage on the replication site, the first set of blocks and the second set of blocks corresponding to the signature, require synchronization; and
marking, in a synchronization structure, a first set of one or more locations on the first de-duplicated physical storage on the production site and a second set of one or more locations on the second de-duplicated physical storage on the replication site, the first set of one or more locations corresponding to the first set of blocks and the second set of one or more locations corresponding to the second set of blocks, the first set of blocks and the second set of blocks corresponding to the signature that require synchronization.

2. The method of claim 1, wherein a splitter intercepts IOs for the virtual machine disk on the production site, and marks each location corresponding to the IOs arriving to the virtual machine disk on the production site as dirty in the synchronization structure.

3. The method of claim 1, wherein a first snapshot of a first LU containing a first file system containing the virtual machine disk on the production site is created on the production site and a second snapshot of a second LU containing a second file system containing the virtual machine disk on the replication site is created on the replication site.

4. The method of claim 3, wherein the first snapshot is attached to a first replication appliance at the production site and the second snapshot is attached to a second replication appliance at the replication site.

5. The method of claim 4, wherein block hashes are read at the production site from the first LU using de-duplicated storage APIs.

6. The method of claim 5, wherein the block hashes from the production site are used with an offset of the second VMDK by a write by Hash command.

7. The method of claim 6, wherein the offset of the second LU used by the write by Hash command is based on the second mapping between the VMDK and the physical LU on the replication site.

8. The method of claim 7, wherein if the write by Hash command fails, then each location associated with the failed write by Hash command is added to the synchronization structure for synchronization at a later point in time.

9. A computer program product comprising:
a non-transitory computer readable medium encoded with computer executable program code, wherein the code enables execution across one or more processors of:
reading a signature corresponding to a portion of data on a virtual machine disk (VMDK) on a production site, wherein reading the signature includes obtaining a first mapping between a first block offset on the virtual machine disk on the production site and a second block offset on a first de-duplicated physical storage on the production site, and reading, based on the first mapping, the signature from the first de-duplicated physical storage on the production site;
sending the signature to a replication site;
obtaining a second mapping between a third block offset on a virtual machine disk on the replication site and a fourth block offset on a second de-duplicated physical disk storage on the replication site;
issuing a command to write the portion of data corresponding to the signature to the second de-duplicated physical storage on the replication site based on the second mapping;
determining, based at least in part on a result of the command, that a first set of blocks on the first de-duplicated physical storage on the production site and a second set of blocks on the second de-duplicated physical storage on the replication site, the first set of blocks and the second set of blocks corresponding to the signature, require synchronization; and
marking, in a synchronization structure, a first set of one or more locations on the first de-duplicated physical storage on the production site and a second set of one or more locations on the second de-duplicated physical storage on the replication site, the first set of one or more locations corresponding to the first set of blocks and the second set of one or more locations corresponding to the second set of blocks, the first set of blocks and the second set of blocks corresponding to the signature that require synchronization.

10. The computer program product of claim 9, wherein a splitter intercepts IOs for the virtual machine disk on the production site, and marks each location corresponding to the IOs arriving to the virtual machine disk on the production site as dirty in the synchronization structure.

11. The computer program product of claim 9, wherein a first snapshot of a first LU containing a first file system containing the virtual machine disk on the production site is created on the production site and a second snapshot of a second LU containing a second file system containing the virtual machine disk on the replication site is created on the replication site, and where the first snapshot is attached to a first replication appliance at the production site and the second snapshot is attached to a second replication appliance at the replication site.

12. The computer program product of claim 11, wherein block hashes are read at the production site from the first LU using de-duplicated storage APIs.

13. The computer program product of claim 12, wherein the block hashes from the production site are used with an offset of the second VMDK by a write by Hash command.

14. The computer program product of claim 13, wherein the offset of the second LU used by the write by Hash command is based on the second mapping between the VMDK and the physical LU on the replication site.

15. The computer program product of claim 14, wherein if the write by Hash command fails, then each location associated with the failed write by Hash command is added to the synchronization structure for synchronization at a later point in time.

16. A system comprising:
a production site;
a replication site; and
computer-executable logic operating in memory, wherein the computer-executable program logic is configured to enable execution across one or more processors of:
reading a signature corresponding to a portion of data on a virtual machine disk (VMDK) on a production site, wherein reading the signature includes obtaining a first mapping between a first block offset on the virtual machine disk on the production site and a second block offset on a first de-duplicated physical storage on the production site, and reading, based on the first mapping, the signature from the first de-duplicated physical storage on the production site;
sending the signature to a replication site;
obtaining a second mapping between a third block offset on a virtual machine disk on the replication site and a fourth block offset on a second de-duplicated physical disk storage on the replication site;
issuing a command to write the portion of data corresponding to the signature to the second de-duplicated physical storage on the replication site based on the second mapping;
determining, based at least in part on a result of the command, that a first set of blocks on the first de-duplicated physical storage on the production site and a second set of blocks on the second de-duplicated physical storage on the replication site, the first set of blocks and the second set of blocks corresponding to the signature, require synchronization; and
marking, in a synchronization structure, a first set of one or more locations on the first de-duplicated physical storage on the production site and a second set of one or more locations on the second de-duplicated physical storage on the replication site, the first set of one or more locations corresponding to the first set of blocks and the second set of one or more locations corresponding to the second set of blocks, the first set of blocks and the second set of blocks corresponding to the signature that require synchronization.

17. The system of claim 16, wherein a splitter intercepts IOs for the virtual machine disk on the production site, and marks each location corresponding to the IOs arriving to the virtual machine disk on the production site as dirty in the synchronization structure.

18. The system of claim 16, wherein a first snapshot of a first LU containing a first file system containing the virtual machine disk on the production site is created on the production site and a second snapshot of a second LU containing a second file system containing the virtual machine disk on the replication site is created on the replica site, and where the first snapshot is attached to a first replication appliance at the production site and the second snapshot is attached to a second replication appliance at the replication site.

19. The system of claim 18, wherein block hashes are read at the production site from the first LU using de-duplicated storage APIs, and wherein the block hashes from the production site are used with an offset of the second VMDK by a write by Hash command, and wherein the offset of the second LU used by the write by Hash command is based on the second mapping between the VMDK and the physical LU on the replication site, and wherein if the write by Hash command fails, then each location associated with the failed write by Hash command is added to the synchronization structure for synchronization at a later point in time.

* * * * *